United States Patent
Lechner et al.

(10) Patent No.: US 10,155,333 B2
(45) Date of Patent: Dec. 18, 2018

(54) TOGGLE CLAMP UNIT OF A PLASTIC PROCESSING MACHINE, ESPECIALLY OF AN INJECTION MOLDING MACHINE

(71) Applicant: WITTMANN BATTENFELD GMBH, Kottingbrunn (AT)

(72) Inventors: Andreas Lechner, Pottenstein (AT); Juergen Pinter, Schattendorf (AT)

(73) Assignee: WITTMANN BATTENFELD GMBH, Kottingbrunn (AT)

( * ) Notice: Subject to any disclaimer, the term of this patent is extended or adjusted under 35 U.S.C. 154(b) by 0 days.

(21) Appl. No.: 15/728,917

(22) Filed: Oct. 10, 2017

(65) Prior Publication Data
US 2018/0099443 A1 Apr. 12, 2018

(30) Foreign Application Priority Data

Oct. 11, 2016 (DE) ...................... 10 2016 012 025

(51) Int. Cl.
*B29C 45/66* (2006.01)
*B29C 45/68* (2006.01)

(52) U.S. Cl.
CPC .......... *B29C 45/661* (2013.01); *B29C 45/681* (2013.01)

(58) Field of Classification Search
CPC ................ B29C 45/661; B29C 45/681; B29C 2045/1792
See application file for complete search history.

(56) References Cited

U.S. PATENT DOCUMENTS

| | | | |
|---|---|---|---|
| 9,011,130 B2 | 4/2015 | Senga | |
| 9,802,350 B2* | 10/2017 | Sasaki | .................. B29C 45/661 |
| 2003/0147989 A1* | 8/2003 | Kasai | .................. B29C 45/1761 |
| | | | 425/593 |
| 2010/0150483 A1* | 6/2010 | Aida | ..................... F16C 29/005 |
| | | | 384/45 |

FOREIGN PATENT DOCUMENTS

| | | |
|---|---|---|
| DE | 10242290 A1 | 4/2004 |
| DE | 102014004379 A1 | 10/2014 |
| DE | 202015002779 U1 | 4/2015 |
| JP | 2016022658 A | 2/2016 |

OTHER PUBLICATIONS

Anonymous"Linearführung—Wikipedia", Oct. 2, 2016 (Oct. 2, 2016), Seiten 1-2, XP055425686, Gefunden im Internet: URL:https://de.wikipedia .org/w/ index. php?title=Linearfuhrung&oldid=158386322 [gefunden am Nov. 16, 2017].

* cited by examiner

*Primary Examiner* — James P Mackey
(74) *Attorney, Agent, or Firm* — Lucas & Mercanti, LLP

(57) ABSTRACT

A toggle clamp unit of a plastic processing machine, especially of an injection molding machine, including a front plate and a crosshead which is arranged movable relatively to the front plate in a direction of closing, wherein at least two levers are supported articulated at the front plate, wherein the at least two levers are each connected articulated with at least one link which links are supported articulated at the crosshead and wherein the crosshead is provided with at least one linear bearing by which the crosshead is movably supported relatively to the front plate in the direction of closing. To design the linear bearing very smooth-running and to reduce the requirement of lubrication the invention proposes that the linear bearing is designed as a roller bearing.

9 Claims, 2 Drawing Sheets

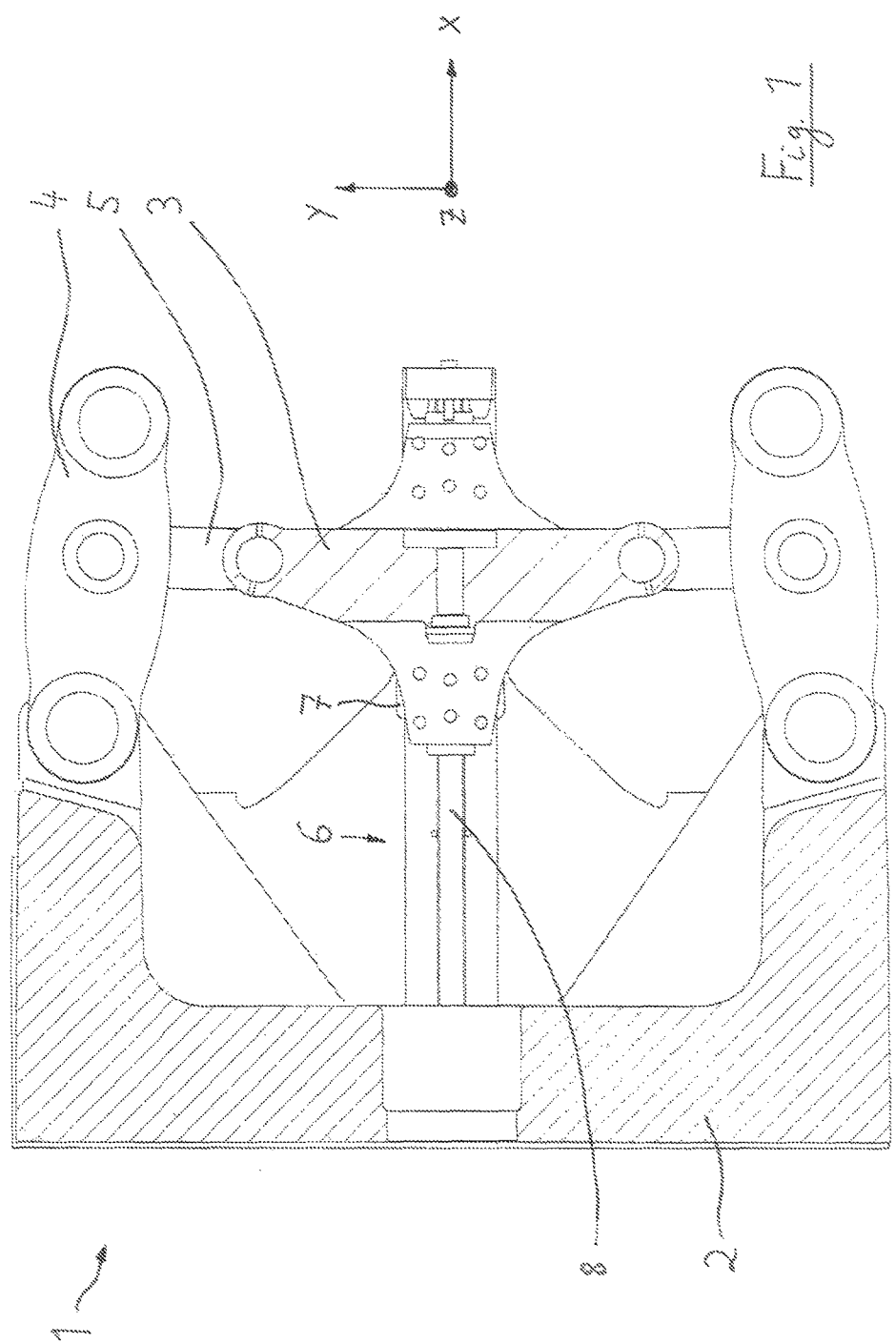

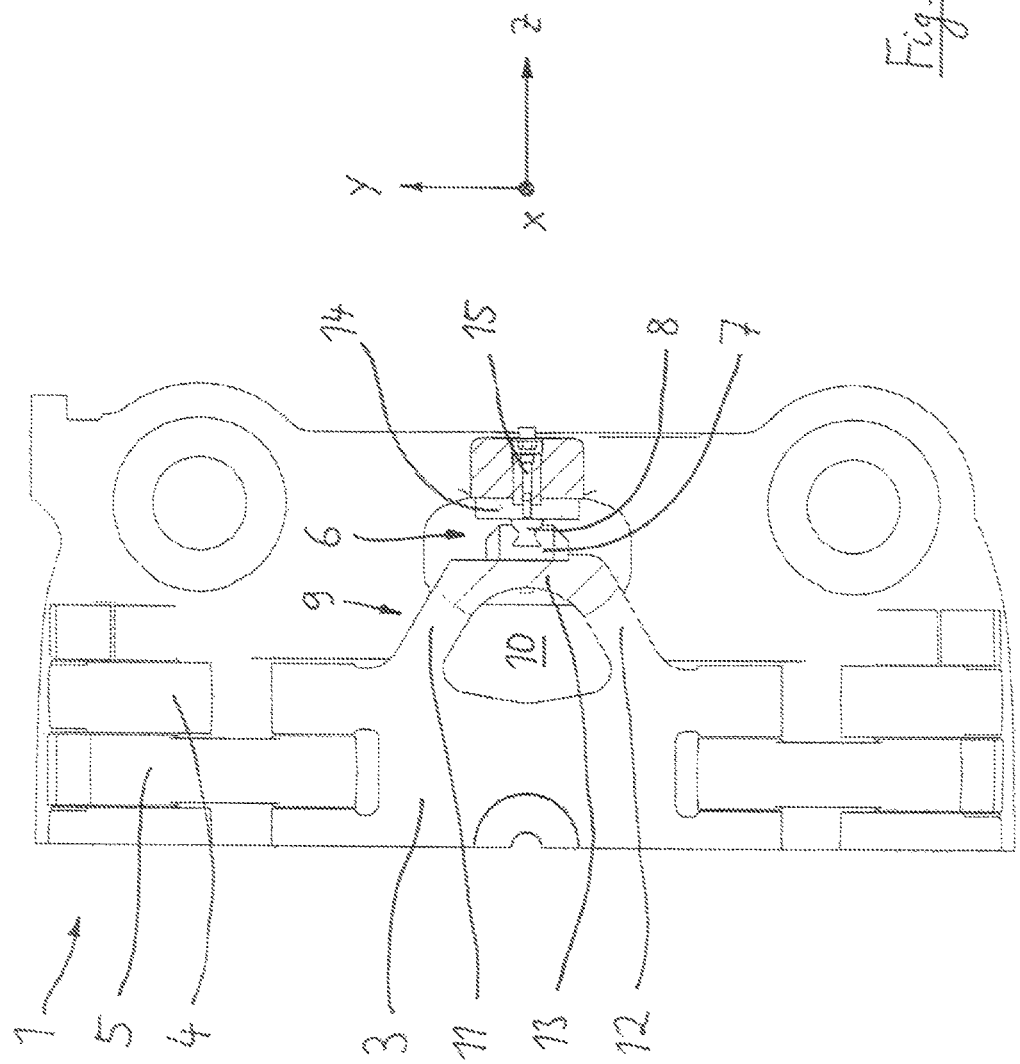

TOGGLE CLAMP UNIT OF A PLASTIC PROCESSING MACHINE, ESPECIALLY OF AN INJECTION MOLDING MACHINE

CROSS-REFERENCE TO RELATED APPLICATIONS

The present application claims priority of DE 10 2016 012 025.8, filed Oct. 11, 2016, the priority of this application is hereby claimed and this application is incorporated herein by reference.

BACKGROUND OF THE INVENTION

The invention relates to a toggle clamp unit of a plastic processing machine, especially of an injection molding machine, comprising a front plate and a crosshead which is arranged movable relatively to the front plate in a direction of closing, wherein at least two levers are supported articulated at the front plate, wherein the at least two levers are each connected articulated with at least one link which links are supported articulated at the crosshead and wherein the crosshead is provided with at least one linear bearing by which the crosshead is movably supported relatively to the front plate in the direction of closing.

A toggle clamp unit for a plastic processing machine of the generic kind is known for example from DE 20 2015 002 779 U1. A linear bearing is provided for the guidance of the crosshead in the direction of closing which is regularly designed as a plain bearing. It is an advantage of such a bearing and the reason that it is used regularly that such a bearing is very resistant against load peaks. However it is detrimental that it has a relatively high friction during operation and that is must be extensively lubricated frequently.

SUMMARY OF THE INVENTION

Thus it is an object of the invention to further develop a toggle clamp unit of the kind mentioned above in such a manner that it allows a specifically smooth-running operation of the clamp unit and that the requirement for lubrication can be reduced.

The solution of this object by the invention is characterized in that the linear bearing is designed as a roller bearing.

Preferably the linear bearing comprises two parts with respective tracks for rolling elements, wherein rolling elements are effectively arranged between the two parts, wherein one part, especially a guiding carriage, is fixed directly or indirectly at the crosshead with its longitudinal extension running in the direction of closing and one part, especially a guiding rail, is fixed directly or indirectly at the front plate with its longitudinal extension running in the direction of closing.

A specifically preferred embodiment of the invention provides that one part of the linear bearing is connected elastically with the crosshead or with the front plate in a first transversal direction which is perpendicular to the direction of closing so that an elastic deformation in the first transversal direction between the part and the crosshead or the front plate is enabled.

One part of the linear bearing, especially a guiding carriage, is preferably connected elastically with the crosshead in the first transversal direction via first spring means. The first spring means are thereby preferably formed by a section of the crosshead which comprises at least one recess which runs in the direction of closing. The first spring means are thereby preferably formed by two journals which are formed in the crosshead and which form a V-shaped or U-shaped structure, seen in the direction of closure, wherein in the transition region of both journals the part of the linear bearing is arranged. By this design the region of the crosshead which carries one of the parts of the linear bearing becomes elastically compared with its remaining structure which is very stiff, so that it becomes possible to prevent an overcharge of the roller guide.

This is also the aim of a further development of the invention by which it is provided that a part of the linear bearing is elastically connected with the front plate in the first transversal direction via second spring means. The second spring means are thereby preferably formed by an intermediate rail which is arranged between the part of the linear bearing and the front plate and which has a lower spring stiffness in the first transversal direction than in a second transversal direction which is perpendicular to the direction of closing and to the first transversal direction.

Specifically preferred it is provided that the intermediate rail has a substantial rectangular cross-section profile; the thickness of the intermediate rail is thereby preferably at least twice as high, preferably at least three times as high, in the second transversal direction than the thickness of the intermediate rail in the first transversal direction.

The intermediate rail is specifically preferred arranged adjustable at the front plate via adjusting means with respect to its position in the first and/or second transversal direction. This allows the elimination of tolerances in an easy manner.

Thus, the proposed concept is basing especially on an elastic deformable design of the crosshead in combination with an also elastic designed and adjustable fixation of the guide by which the linear bearing being a roller bearing can be effectively protected against overload.

A further advantage is the low energy consumption of the very smooth-running linear bearing and the reduced requirement of lubrication of the linear guide.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

In the drawing:

FIG. 1 shows the side view of a part of a toggle clamp unit of an injection molding machine and FIG. 2 shows the front view of one of the halves of the part of the toggle clamp unit according to FIG. 1.

DETAILED DESCRIPTION OF THE INVENTION

In the figures a part of a toggle clamp unit 1 of an injection molding machine is shown, wherein in FIG. 2 only one half of the unit is depicted which is symmetrically to a centre plane. The clamp unit 1 comprises a front plate 2 as well as a crosshead 3, which is movably arranged in a direction of closing x. The movement of the crosshead 3 in the direction of closing x can take place in an arbitrary manner, especially exclusively electrically or hydraulically.

Via a lever 4 and links 5 an articulated connection is established between the front plate 2 and the crosshead 3.

The further design of the clamp unit 1, which is however not relevant with respect to the invention here, is described for example in DE 20 2015 002 779 U1 of the applicant to which insofar explicitly reference is made.

For a proper operation of the clamp unit 1 the crosshead 3 must be supported by means of a linear bearing 6, wherein in the embodiment each one linear bearing 6 is provided at both sides of the crosshead 3 (in FIG. 2 only the linear bearing at one of the sides of the crosshead 3 is shown).

It is essential that the linear bearing 6 is designed as a roller bearing.

Thereby, each linear bearing 6 comprises a guiding rail 8 on which at least one guiding carriage 7 runs movable in a linear direction (preferably two guiding carriages 7 are arranged on one guiding rail 8 which are connected with the crosshead 3 offset in the direction of closing). This concept of the linear bearing 6 is here described as such with two parts, wherein one part is the guiding rail 8 and one part is the guiding carriage 7. As said it is also possible that several guiding carriages 7 run on one guiding rail 8. Thereby, it is not mandatory at which part the guiding rail 8 and at which part the guiding carriage 7 is fixed. However, it is preferred and shown in the embodiment that the guiding rail 8 is connected (indirectly) at the front plate 2 and the guiding carriage 7 is (directly) fixed at the crosshead 3.

Both the guiding carriage and the guiding rail have respective raceways for (not depicted) rolling elements; the rolling elements which are arranged between the both parts 7 and 8 provide a low-friction bearing during the relative movement of the two parts 7, 8 in the direction of closing x.

In order that the linear bearing 6, which is a roller bearing and is thus more sensitive at load peaks than pre-known plain bearings, does not suffer at load peaks and incidentally tolerances can be compensated the following described and preferred embodiment is provided:

The guiding carriage 7 is in fact directly connected at the crosshead 3, however the crosshead 3 is specifically designed in its lateral region which carries the guiding carriage 7 to establish the function of first spring means 9. For doing so a recess 10 extends in the direction of closing x through the crosshead 3 (thus a void; also a plurality of voids can be provided) so that in the lateral region of the crosshead two journals 11 and 12 remaining which are connected with another by a transition region 13. Accordingly the guiding carriage 7 can deflect at peak loads in a first transversal direction z which is perpendicular to the direction of closing x and thus treat the linear bearing 6 with care and protect it respectively.

In a similar manner the guiding rail 8 is not directly fixed at the front plate 2 but via second spring means 14 in the form of an intermediate rail. The intermediate rail has a substantially rectangular shape in a cross-section and extends in the first transversal direction z only with a relatively small thickness, however in a hereunto perpendicular second transversal direction y with a bigger thickness. This involves that in the first transversal direction z a relatively elastic mounting of the guiding rail 8 is given, while in the second transversal direction y the guiding rail 8 is substantial stiffer and provides thus a good guidance for the crosshead 3.

The precise positioning of the guiding rail 8, i. e. namely of the intermediate rail 14 on the front plate 2, can be carried out by adjusting means 15 so that especially the compensation of tolerances is possible in a simple manner.

Thus, according to the preferred embodiment a 5-point clamp unit is provided which is known as such at which the crosshead 3 serves to bring the levers 4 via the links 5 in the extended position. The crosshead 3 can be driven hydraulically as well as electrically; in any case the linear movement is carried out by a drive system.

As explained at the known solutions the crosshead is guided by means of plane bearings with the disadvantage of an increased coefficient of friction, higher wear and abrasion; furthermore an increased demand for lubricant exists.

To avoid those disadvantages the proposed concept provides to guide the crosshead 3 by means of smooth-running linear guides and linear bearings 6 respectively with lowest rolling friction resistance.

Due to the design, the production tolerances and the deformations at the creation of the closing force relatively high loads onto the linear bearing are applied in different directions. The proposed linear roller bearings are insofar more sensitive with respect to a peak load than conventional plain bearings.

Therefore, the construction of the crosshead 3 is designed in such a manner that the same can deform in partial sections elastically at the introduction of forces during the creation of the closing force—namely in the region of the first spring means 9—so that the linear bearing 6 is protected against peak loads.

Also, a tension-free possibility of adjustment is provided for the compensation of tolerances between the front plate 2 and the crosshead 3 by the adjusting means 15 in the horizontal x-direction.

The adjustable intermediate rail 14 on which the guiding rail is mounted is also elastically deformable in the horizontal x-direction and is designed stiff in the y-direction to avoid tilting of the crosshead 3.

While specific embodiments of the invention have been shown and described in detail to illustrate the inventive principles, it will be understood that the invention may be embodied otherwise without departing from such principles.

We claim:

1. A toggle clamp unit of a plastic processing machine, comprising a front plate and a crosshead which is arranged movable relatively to the front plate in a direction of closing, wherein at least two levers are supported articulated at the front plate, wherein the at least two levers are each connected articulated with at least one link which links are supported articulated at the crosshead and wherein the crosshead is provided with at least one linear bearing by which the crosshead is movably supported relatively to the front plate in the direction of closing, wherein the linear bearing is designed as a roller bearing, wherein the linear bearing comprises two parts with respective tracks for rolling elements, wherein rolling elements are effectively arranged between the two parts, wherein a first part of the two parts is fixed directly or indirectly at the crosshead with its longitudinal extension running in the direction of closing and a second part of the two parts is fixed directly or indirectly at the front plate with its longitudinal extension running in the direction of closing, and wherein at least one of: the first part is connected elastically with the crosshead in a first transversal direction which is perpendicular to the direction of closing so that an elastic deformation in the first transversal direction between the first part and the crosshead is enabled; and the second part is connected elastically with the front plate in the first transversal direction so that an elastic deformation in the first transversal direction between the second part and the front plate is enabled.

2. The toggle clamp unit according to claim 1, wherein the first part of the linear bearing is connected elastically with the crosshead in the first transversal direction via first spring means.

3. The toggle clamp unit according to claim 2, wherein the first spring means are formed by a section of the crosshead which comprises at least one recess which runs in the direction of closing.

4. The toggle clamp unit according to claim 3, wherein the first spring means are formed by two journals which are formed in the crosshead and which form a V-shaped or U-shaped structure, seen in the direction of closing, wherein in the transition region of both journals the first part of the linear bearing is arranged.

5. The toggle clamp unit according to claim 1, wherein the second part of the linear bearing is elastically connected with the front plate in the first transversal direction via second spring means.

6. The toggle clamp unit according to claim 5, wherein the second spring means are formed by an intermediate rail which is arranged between the second part of the linear bearing and the front plate and which has a lower spring stiffness in the first transversal direction than in a second transversal direction which is perpendicular to the direction of closing and to the first transversal direction.

7. The toggle clamp unit according to claim 6, wherein the intermediate rail has a substantially rectangular cross-section profile, wherein the thickness of the intermediate rail is at least twice as high in the second transversal direction than the thickness of the intermediate rail in the first transversal direction.

8. The toggle clamp unit according to claim 6, wherein the intermediate rail is arranged adjustable at the front plate via adjusting means with respect to its position in the first and/or second transversal direction.

9. The toggle clamp unit according to claim 1, wherein the first part is a guiding carriage and the second part is a guiding rail.

* * * * *